United States Patent
Zhu

(10) Patent No.: US 7,051,135 B2
(45) Date of Patent: May 23, 2006

(54) HIERARCHICAL BUS ARBITRATION

(75) Inventor: Jun Zhu, Fremont, CA (US)

(73) Assignee: ESS Technology, Inc., Fremont, CA (US)

(*) Notice: Subject to any disclaimer, the term of this patent is extended or adjusted under 35 U.S.C. 154(b) by 349 days.

(21) Appl. No.: 10/302,723

(22) Filed: Nov. 22, 2002

(65) Prior Publication Data

US 2004/0103231 A1    May 27, 2004

(51) Int. Cl.
    *G06F 13/36*      (2006.01)
    *G06F 13/364*      (2006.01)

(52) U.S. Cl. ................. 710/116; 710/113; 710/243

(58) Field of Classification Search .......... 710/113, 710/115, 116, 120, 309, 240–244
See application file for complete search history.

(56) References Cited

U.S. PATENT DOCUMENTS

| | | | |
|---|---|---|---|
| 5,088,024 A | | 2/1992 | Vernon et al. |
| 5,241,632 A | * | 8/1993 | O'Connell et al. ......... 710/117 |
| 5,388,228 A | | 2/1995 | Heath et al. |
| 5,481,680 A | * | 1/1996 | Larson et al. ............... 710/113 |
| 5,517,495 A | | 5/1996 | Lund et al. |
| 5,528,767 A | | 6/1996 | Chen |
| 5,546,548 A | * | 8/1996 | Chen et al. ................. 710/116 |
| 5,581,782 A | * | 12/1996 | Sarangdhar et al. ........ 710/119 |
| 5,649,206 A | * | 7/1997 | Allen ......................... 710/241 |
| 5,790,869 A | | 8/1998 | Melo et al. |
| 5,797,020 A | | 8/1998 | Bonella et al. |
| 5,832,278 A | | 11/1998 | Pham |
| 5,923,859 A | | 7/1999 | Melo et al. |
| 5,944,809 A | | 8/1999 | Olarig et al. |
| 5,983,302 A | * | 11/1999 | Christiansen et al. ....... 710/113 |
| 6,073,199 A | * | 6/2000 | Cohen et al. ............... 710/113 |
| 6,092,137 A | | 7/2000 | Huang et al. |
| 6,148,002 A | | 11/2000 | Patel et al. |
| 6,157,978 A | | 12/2000 | Ng et al. |
| 6,205,524 B1 | | 3/2001 | Ng |
| 6,272,580 B1 | | 8/2001 | Stevens et al. |

* cited by examiner

*Primary Examiner*—Tim Vo
*Assistant Examiner*—Trisha Vu
(74) *Attorney, Agent, or Firm*—Farjami & Farjami LLP

(57) ABSTRACT

Methods, apparatus, and systems are presented for arbitrating access to a shared resource involve deciding whether to grant access to the shared resource to at least one of a first plurality of devices in accordance with a first arbitration algorithm and deciding whether to grant access to the shared resource to at least one of a second plurality of devices in accordance with a second arbitration algorithm distinct from the first arbitration algorithm, if access to the shared resource is not granted to at least one of the first plurality of devices.

Arbitration algorithms that may be used as the first and/or second arbitration algorithm include fixed-priority algorithms, round-robin algorithms, and most-recently-used algorithms. In accordance with one embodiment, at least one of the first and second arbitration algorithms is implemented in hardware adapted to switch from executing one arbitration algorithm to executing another arbitration algorithm in one clock cycle.

27 Claims, 5 Drawing Sheets

HIERARCHICAL BUS ARBITRATION

CROSS-REFERENCES TO RELATED APPLICATIONS

Not Applicable

BACKGROUND OF THE INVENTION

This invention is related generally to the field of shared resource arbitration and other methods adaptable and suitable for arbitrating amongst devices competing for access to a shared resource. Specifically the present invention relates to multiple-level bus arbitration techniques and systems.

Bus arbitration techniques are relevant in a wide variety of applications involving shared communication resources. For example, any system employing a set of signal paths shared by more than one device can potentially implement an appropriate bus arbitration algorithm that determines how such devices are given access to the shared signal paths. The design of a bus arbitration technique thus affects greatly the character of signal transmission in such a system. One illustrative system implementing a bus arbitration technique may be a system having different processing, memory, and I/O components linked by a shared set of signal paths and implemented within a single semiconductor device. Another illustrative system may be a computer system having separate subsystems, such as various semiconductor devices, connected through at least one common bus. Yet another illustrative system may be a networked system having a number of different computers connected by a common network interface.

A given bus arbitration technique is typically based on a specific arbitration algorithm. Known arbitration algorithms include fixed-priority algorithms, round-robin algorithms, and most-recently-used ("MRU") algorithms, which are briefly described below.

Generally, a fixed-priority algorithm provides a fixed order in which devices are granted access to the shared communication resource. For example, in a system having four devices, device 1 through device 4, competing for access to a shared communication resource, a fixed-priority algorithm may provide access to the shared resource in the following order: device 1, followed by device 2, followed by device 3, followed by device 4. That is, when access is to be arbitrated amongst these four particular devices, device 1 is always examined first to determine if it needs the access. If so, access is granted to device 1. Otherwise, device 2 is next examined to determine if it needs the access. If so, access is granted to device 2. Otherwise, device 3 is next examined, and so on. Each time access to the shared communication resource becomes available, it is offered first to device 1, then to device 2, then to device 3, and then to device 4. In this sense, device 1 is always the "starting device" in a fixed order or priority. Thus, the fixed-priority algorithm is not generally considered fair in that the algorithm always favors device 1 the most, followed by device 2, then device 3, and finally device 4.

A round-robin algorithm generally provides an order in which devices are examined for granting access to the shared communication resource such that the devices take turns at being the starting device in the order. Thus, the order is not fixed. The same system described above having devices 1 through 4 is used as an example. In one arbitration cycle, the devices are examined in the following order: device 1, followed by device 2, followed by device 3, followed by device 4. Here, the starting device is device 1. However, in the next arbitration cycle, the devices are examined in a shifted order: device 2, followed by device 3, followed by device 4, followed by device 1. Here, the starting device is device 2. In this manner, the four devices take turns at being the starting device. Because the round-robin algorithm does not favor one device over another over multiple arbitration cycles, the round-robin algorithm is generally considered more fair than the fixed-priority algorithm in a certain sense.

An MRU algorithm generally provides an order in which devices are examined for granting access to the shared communication resource such that the device that was most recently granted access receives the least consideration in the current arbitration cycle (e.g., is forced to be the last device examined in the order). Again, the system having devices 1 through 4 is used as an example. Assuming in one arbitration cycle, the devices are examined in the following order: device 1, followed by device 2, followed by device 3, followed by device 4, and access to the shared communication resource is granted to device 2, then the order in the subsequent arbitration cycle might be the following: device 3, followed by device 4, followed by device 1, followed by device 2. Since the device that most recently received a grant of access is device 2, the order for the subsequent arbitration cycle places device 2 as the last device in the order to be examined, causing device 2 to receive the least consideration. Thus, the MRU algorithm is also considered more fair in a certain sense than the fixed-priority algorithm.

Current bus arbitration techniques also include bi-level bus arbitration systems, which address the need for providing different priority to different devices in accessing the shared communication resource. In a bi-level bus arbitration system, each device connected to a shared communication resource is assigned to either a high priority group or a low priority group, depending on the urgency with which the device is granted access to the shared communication resource. For example, certain devices handling data, such as audio data, that require more immediate access to the shared communication resource may be assigned to the high priority group. Other devices that can tolerate a longer delay in accessing the shared communication resource may be assigned to the low priority group. Access to the shared communication resource is thus granted based on membership in either the high priority group or low priority group. Generally, devices in the high priority group are provided more immediate access, whereas devices in the low priority group are provided access involving more delay.

While currently available bi-level bus arbitration techniques allow priority access differentiation between two groups of devices, such differentiation is based solely on an assignment of priority. That is, beyond generally providing one group with a higher priority and the other group with a lower priority, there is little distinction between the two groups. Specifically, the same arbitration algorithm is generally applied within each of the two groups. By differentiating between groups of devices on the basis of group priority alone, the currently available bi-level bus arbitration techniques fails to take into account more complex arbitration needs of each of the various priority groups. Consequently, more efficient methods of providing bus arbitration decisions that do take into account such particular needs cannot be achieved using currently available techniques.

There is a need for a bus arbitration technique that is capable of not only providing multiple-level priority arbitration for devices attempting to access a shared communication resource, but also addressing differing arbitration needs between multiple levels of priority.

BRIEF SUMMARY OF THE INVENTION

The present invention provides a new method, apparatus, and system for arbitrating access to a shared resource that involve deciding whether to grant access to the shared resource to at least one of a first plurality of devices in accordance with a first arbitration algorithm. The method, apparatus, and system further involve deciding whether to grant access to the shared resource to at least one of a second plurality of devices in accordance with a second arbitration algorithm distinct from the first arbitration algorithm, if access to the shared resource is not granted to at least one of the first plurality of devices.

Arbitration algorithms that may be used as the first and/or second arbitration algorithm include fixed-priority algorithms, round-robin algorithms, and MRU algorithms. In accordance with one embodiment of the invention, at least one of said first and second arbitration algorithms is implemented in hardware adapted to execute a plurality of arbitration algorithms, and wherein said hardware is further adapted to switch from executing one arbitration algorithm to executing another arbitration algorithm in one clock cycle.

Deciding whether to grant access to the shared resource to at least one of the first plurality of devices may comprise the steps of associating each of the first plurality of devices with one of a plurality of positions in a ring, selecting one of the first plurality of devices as a starting device in the ring according to the first arbitration algorithm, and servicing each of the first plurality of devices in order according to its associated position in the ring, starting with the starting device, wherein servicing each device comprises detecting whether the device has requested access to the shared resource and granting the device access to the shared resource if the device has requested access and access is available.

Deciding whether to grant access to the shared resource to at least one of the first plurality of devices may further comprise the step of storing in a memory unit at least one information state used in selecting the starting element, for each of the first plurality of devices. The information state may relate to which one of the first plurality of devices was granted access to the shared resource in a previous arbitration cycle. The information state may relate to which one of the first plurality of devices was selected as a starting device in a previous arbitration cycle. Furthermore, the information state stored by the memory unit may be programmably selected.

According to one embodiment, the first and second plurality of devices are disposed in a single semiconductor device. According to another embodiment, the first and second plurality of devices are disposed in a common computer system. According to yet another embodiment, the first and second plurality of devices are disposed in a common network of computers.

A further understanding of the nature and advantages of the present invention may be realized by reference to the remaining portions of the specification and the drawings.

DETAILED DESCRIPTION OF THE INVENTION

Figure 1:
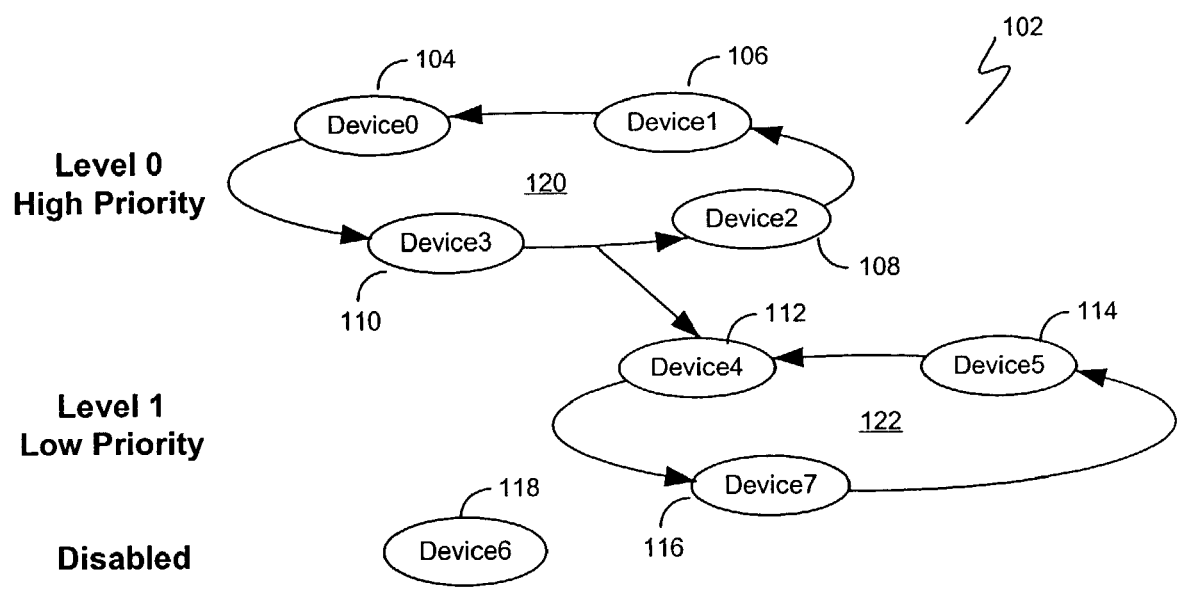
FIG. 1 illustrates an arrangement by which a token is passed from device to device in a two-level bus arbitration structure in accordance with one embodiment of the present invention.

FIG. 1 illustrates an arrangement 102 by which a token is passed from device to device in a two-level bus arbitration structure in accordance with one embodiment of the present invention. Here, the term token refers generally to an opportunity to access a shared communication resource. As shown, the arrangement 102 includes a number of devices that may compete for access to a shared communication resource, such as a bus (not shown). The devices are divided into three group: (1) high priority—Level 0, (2) low priority—Level 1, and (3) disabled. Devices 104, 106, 108, and 110 belong to the high priority group and are situated at Level 0. Devices 112, 114, and 116 belong to the low priority group and are situated at Level 1. Device 118 belongs to the disabled group.

High priority devices 104, 106, 108, and 110 are shown in a ring 120, which illustrates that a token is passed from one high priority device to the next, in accordance with an arbitration algorithm applied to ring 120. That is, the opportunity to gain access to the shared communication resource (not shown) is passed from one device to the next amongst the high priority devices, in an order determined by the chosen arbitration algorithm. This arbitration algorithm may be, for example, a fixed-priority algorithm, a round-robin algorithm, an MRU algorithm, variations of these algorithms, and/or others.

Furthermore, ring 120 illustrates that a token is passed from one high priority device to the next high priority device, not that the high priority devices must be physically connected in a ring structure. In fact, in various embodiments of the present invention, the high priority devices may be connected in a ring, bus, star, or other structure.

Low priority devices 112, 114, and 116 are shown in a ring 122. In a similar manner, ring 122 illustrates that a token is passed from one low priority device to the next, in accordance with an arbitration algorithm applied to ring 122. This arbitration algorithm may be, for example, a fixed-priority algorithm, a round-robin algorithm, an MRU algorithm, variations of these algorithms, and/or others. Further, ring 122 illustrate that a token is passed from one low priority device to another low priority device, not that the low priority devices must be physically connected in a ring structure. In fact, in various embodiments of the present invention, the low priority devices may be connected in a ring, bus, star, or other structure.

In accordance with the present invention, the arbitration algorithm applied to ring 120 may be different than the arbitration algorithm applied to ring 122. For example, in one embodiment, ring 120 may use a fixed-priority algorithm, while ring 122 may use a round-robin algorithm. Such a multiple-level arbitration scheme having distinct algorithms at different priority levels allows for differing arbitration needs of the various groups of devices to be taken into account.

In the above example, the fixed-priority algorithm selected for ring 120 may provide a fixed order of arbitrating access to the shared communication resource amongst high priority devices 104, 106, 108, and 110. For instance, high priority device 104 may be a device handling high-quality video data that is always examined first to see if it is requesting access to the shared communication resource. High priority device 106 may be a device of slightly lesser importance that is always examined second. High priority devices 108 and 110 may be devices of even lesser importance that are always examined third and fourth, respectively. Thus, the order by which the high priority devices are examined is fixed.

Meanwhile, the round-robin algorithm selected for ring 122 may provide a more fair order of arbitrating access to the shared communication resource to low priority devices 112, 114, and 116. The low priority devices 112, 114, and 116 may be various peripheral devices that are of less importance than the high priority devices but of equal importance relative to one another, in terms of the need to gain access to the shared communication resource. In this manner, the multiple-level arbitration scheme having different algorithms at different priority levels allows for greater flexibility to efficiently accommodate the access needs of different devices competing for a shared communication resource.

Referring again to FIG. 1, the disabled group is shown to include device 118. Devices organized in the disabled group may thus be excluded from the arbitration process, either temporarily or for sustained periods of time, depending on the application. The use of a disabled group allows additional flexibility in the bus arbitration scheme.

Figure 2:
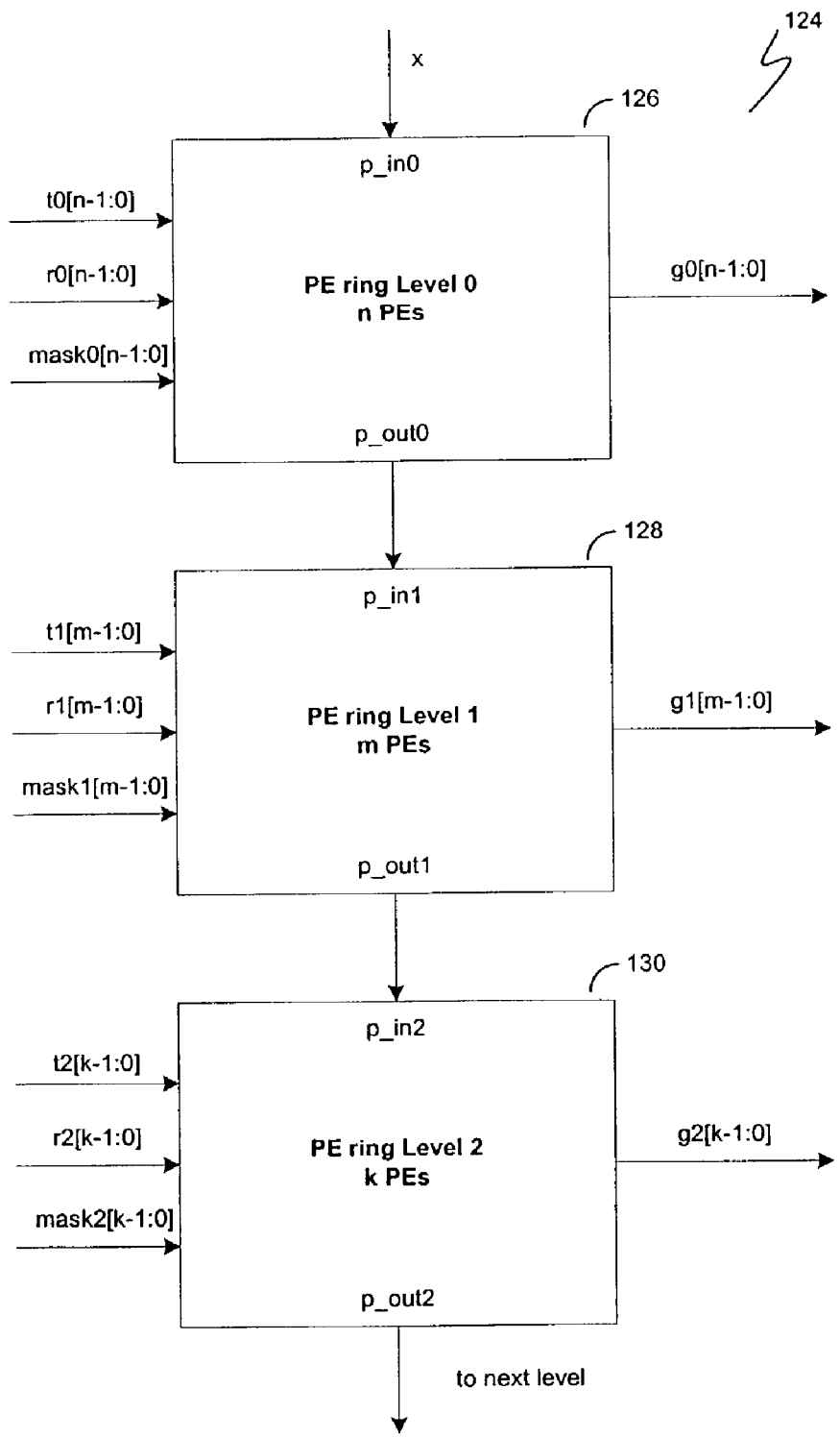
FIG. 2 is simplified block diagram of an example of a three-level bus arbitration structure in accordance with one embodiment of the present invention.

FIG. 2 is simplified block diagram of an example of a three-level bus arbitration structure 124 in accordance with one embodiment of the present invention. The three-level bus arbitration structure 124 also has a disable option. Here, a third level of priority is added to demonstrate the multiple-level characteristic of the present invention. As can be seen, additional priority levels can be readily added. In the present embodiment, each additional priority level can be added by simply inserting a structure similar to one of the existing priority levels. In other embodiments, new priority levels having different structures may be added, depending on the implementation. Thus, while FIG. 2 shows three priority levels, systems having more than three priority levels may be implemented and are within the scope of the present invention.

The three-level bus arbitration structure 124 includes three priority element rings ("PE Rings"): PE Ring 126, PE Ring 128, and PE Ring 130. The term priority element ring is chosen as a convenient label for a set of structures demonstrating an embodiment of the present invention illustrated in the figures and described herein and is not used to restrict such structures in any sense. The bus arbitration structure 124 functions by organizing each device competing for the shared communication resource into one of the three priority levels: Level 0, Level 1, and Level 2. Devices grouped in Level 0 have the highest priority and are handled by PE Ring 126. Devices grouped in Level 1 have the next level priority and are handled by PE Ring 128. Devices grouped in Level 2 have the lowest priority and are handled by PE Ring 130.

According to the present embodiment, PE Ring 126 examines all of the devices in Level 0 according to the particular arbitration algorithm selected for Level 0. If access to the shared communication resource is not granted to any of the devices in Level 0 by PE Ring 126, then signal p_out0 of PE ring 126 (provided to PE ring 128 as signal p_in1) makes a low-to-high logic transition, for example, to declare that access to the shared communication resource has not been granted at Level 0 and is now available at Level 1. Upon receiving this indication, PE Ring 128 performs similar steps as described above for PE Ring 126, but using the particular arbitration algorithm selected for Level 1.

If access to the shared communication resource is not granted to any of the devices in Level 1 by PE Ring 128, then signal p_out1 of PE ring 128 (provided to PE ring 130 as signal p_in2) makes a low-to-high logic transition, for example, to declare that access to the shared communication resource has not been granted at Level 1. Upon receiving this signal, PE Ring 130 performs similar steps as described above for PE Ring 126, but using the particular arbitration algorithm selected for Level 2. Thus, each of PE Rings 126, 128, and 130 performs bus arbitration in conformity with its selected priority level and arbitration algorithm.

The input and output signals of PE Ring 126 shown in FIG. 2 are discussed below. PE Ring 126 comprises n priority elements ("PEs"), which are described in further detail in FIGS. 4A and 4B. The term priority element is chosen as a convenient label for a set of structures demonstrating an embodiment of the present invention illustrated in the figures and described herein and is not used to restrict such structures in any sense. PE Ring 126 receives a one-bit priority signal x, an n-bit token signal t0[n−1:0], an n-bit request signal r0[n−1:0], and an n-bit mask signal mask0[n−1:0]. PE Ring 126 outputs an n-bit grant signal g0[n−1:0] and the previously mentioned one-bit priority signal p_out0.

Figure 3:
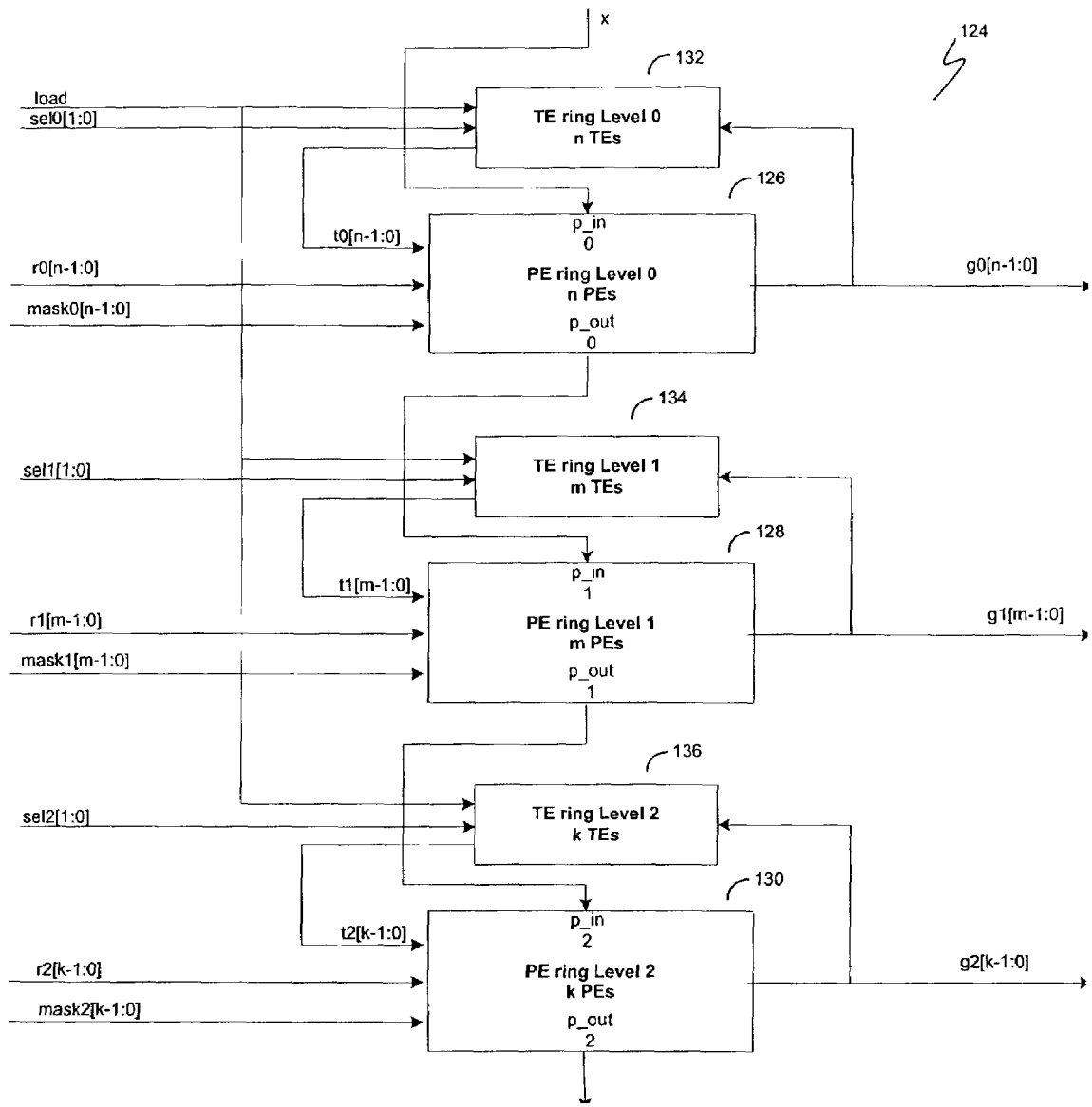
FIG. 3 is a more detailed block diagram of the three-level bus arbitration structure shown in FIG. 2.

The priority signal x is received from a higher priority level, if there is one. Here, PE Ring 126 is at the highest priority level (Level 0), so the priority signal x may be a constant "1" signal, or a signal activating the arbitration structure 124, or some other signal allowing arbitration to proceed. The n-bit token signal t0[n−1:0] is received from a token element ring ("TE Ring"), which is not shown in FIG. 2 for clarity of illustration. TE Rings are shown in FIG. 3, as described in later sections. The term token element ring is chosen as a convenient label for a set of structures demonstrating an embodiment of the present invention illustrated in the figures and described herein and is not used to restrict such structures in any sense.

The t0[n−1:0] signal indicates which one of the n PEs in Level 0 is selected as the first element examined in the current arbitration cycle of the arbitration algorithm. As such, the t0[n−1:0] signal is influenced by the selection of a particular priority algorithm for Level 0. The n-bit request signal r0[n−1:0] indicates which of the n devices in Level 0 has requested access to the shared communication resource. The n-bit mask signal mask0[n−1:0] indicates which one(s) of the n devices in Level 0 is "masked out," or "disabled," so as to not be considered in the arbitration process. The n-bit grant signal g0[n−1:0] indicates which one of the n devices in Level 0 has been granted access to the shared communication resource. As discussed above, the one-bit priority signal p_out0 provides an indication from PE Ring 126 to PE Ring 128 to declare that access to the shared communication resource has not been granted at Level 0 and is now available at Level 1.

PE Ring 128 and PE Ring 130 have similar input and output signals as PE Ring 126. Since PE Ring 128 has m priority elements (corresponding to m devices in Level 1), the multiple-bit signals associated with PE Ring 128, for example, t1[m−1:0], r1[m−1:0], mask1[m−1:0], and g1[m−1:0], are m-bit signals. Similarly, since PE Ring 130 has k priority elements (corresponding to k devices in Level 2), the multiple-bit signals associated with PE Ring 128, for example, t2[k−1:0], r2[k−1:0], mask2[k−1:0], and g2[k−1:0], are k-bit signals.

FIG. 3 is a more detailed block diagram of the three-level bus arbitration structure 124 shown in FIG. 2. Specifically, FIG. 3 shows the TE Rings mentioned above that are not shown in FIG. 2. In Priority Level 0, TE Ring 132 provides the n-bit token signal t0[n−1:0] to PE Ring 126. TE Ring 132 also receives a one-bit load signal providing the instruction to load memory register(s) (not shown in FIG. 3) for the subsequent arbitration cycle in the arbitration algorithm, a two-bit algorithm select signal sel0[1:0] indicating the selection of a particular arbitration algorithm for Level 0, and the n-bit grant signal g0[n−1:0] discussed previously. In Priority Level 1, TE Ring 134 provides the m-bit token signal t1[m−1:0] to PE Ring 128. TE Ring 134 also receives the one-bit load signal, a two-bit algorithm select signal sel0[1:0] indicating the selection of a particular arbitration algorithm for Level 1, and the m-bit grant signal g1[m−1:0] discussed previously. In Priority Level 2, TE Ring 136 provides the k-bit token signal t2[k−1:0] to PE Ring 130. TE Ring 136 receives the one-bit load signal, a two-bit algorithm select signal sel2[1:0] indicating the selection of a particular arbitration algorithm for Level 2, and the k-bit grant signal g2[k−1:0] described previously. Thus, PE ring 126 works in conjunction with TE ring 132 to provide arbitration for devices grouped in Priority Level 0; PE ring 128 works in conjunction with TE ring 134 to provide arbitration for devices grouped in Priority Level 1; and PE ring 130 works in conjunction with TE ring 136 to provide arbitration for devices grouped in Priority Level 2.

Figure 4A:
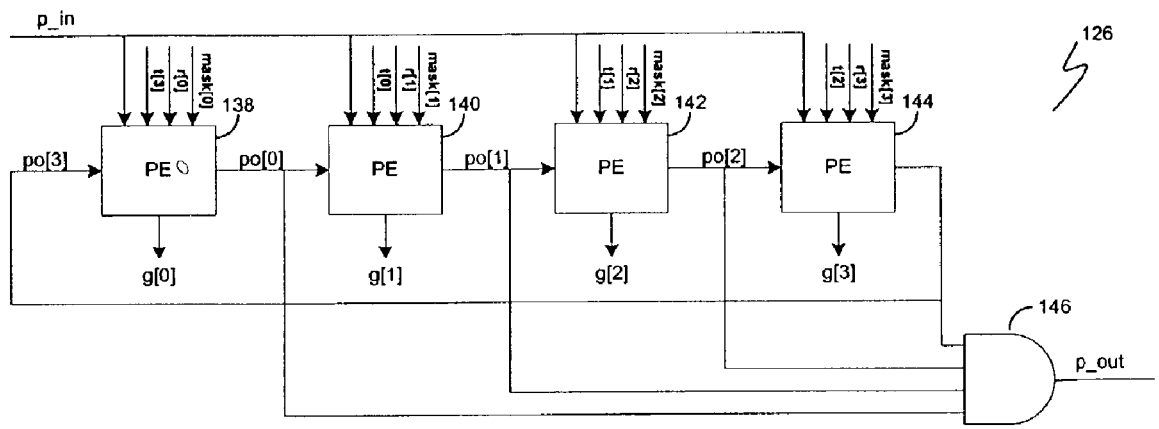
FIG. 4A is a high level logic block diagram of one of the priority element rings shown in FIG. 3.

FIG. 4A is a high level logic block diagram of one of the PE rings shown in FIG. 3. PE ring 126 is illustrated here as an example. PE ring 126 determines which one of the devices in the current priority level requesting access to the shared communication resource is to be granted the access, based on a dynamically selected arbitration algorithm specific to the current priority level. As shown, PE Ring 126 includes priority elements (PEs) 138, 140, 142, and 144, each corresponding to a different device in Priority Level 0. While four PEs for four devices are shown, any number of devices may be handled, by simply adding the appropriate number of PEs.

By arranging PEs 138, 140, 142, and 144 in a ring structure, ring 126 provides an efficient and flexible format for selecting a single PE amongst competing PEs in each arbitration cycle of an arbitration algorithm, based on an order of priority of the PEs that can be changed from one arbitration cycle to the next. Specifically, in each arbitration cycle, a "starting PE" is selected and accorded the highest priority. The priority accorded each of the rest of the PEs depends on its position in the ring relative to the "starting PE." The n-bit token signal t[3:0] (n=4) indicates which one of the PEs 138, 140, 142, and 144 is the "starting PE" for the current arbitration cycle.

If the "starting PE" has a request for access from its corresponding device, the "starting PE" grants access to its corresponding device. This means that access to the shared communication resource is granted by the "starting PE," therefore, none of the other PEs may grant access in this arbitration cycle. If the "starting PE" does not have a request for access from its corresponding device, the "starting PE" does not grant access, and the next PE in the ring operates. If that next PE has a request for access from its corresponding device, that next PE grants access to its corresponding device. Else, that next PE does not grant access, and the following PE in the ring operates, and so on. The 4-bit request signal r[3:0] indicates which, if any, of the PEs 138, 140, 142, and 144 has a request for access from its corresponding device. The 4-bit grant signal g[3:0] indicates which, if any, of the PEs 138, 140, 142, and 144 has granted access to its corresponding device.

For example, if PE 140 is selected as the "starting PE" (t[0]="1") PE 140 operates first. Assuming that PE 140 does not have a request for access from its corresponding device (r[1]="0"), then PE 140 does not grant access to its corresponding device (g[1]="0"). A signal p[1]="1" indicates to the next PE in the ring, PE 142, that access has not yet been granted. Assuming further that PE 142 also does not have a request for access from its corresponding device (r[2]="0"), then PE 142 does not grant access to its corresponding device (g[2]="0"). A signal p[2]="1" indicates to the next PE in the ring, PE 144, that access has not yet been granted. Assuming further still that PE 144 does have a request for access from its corresponding device (r[3]="1"), then PE 144 does grant access to its corresponding device (g[3]="1"). A signal p[3]="0" indicates to the next PE in the ring, PE138, that access has been granted. Given a p[3]="0" signal, PE 138 will not grant access to its corresponding device, even if a request for access is present. Thus, in this arbitration cycle of the arbitration algorithm, the device corresponding to PE 144 has been granted access to the shared communication resource.

As shown in FIG. 4A, an AND gate 1 46 determines whether all of the signals po[1], po[2], po[3], and po[4] are "1," indicating that access has not yet been granted after all four PEs 138, 140, 142, and 144 in Level 0 have operated to examine the presence of requests for access from their respective devices. In other words, a logic "1" of output signal p_out from AND gate 146 indicates that access to the shared communication resource has not been granted at Level 0 and is now available at Level 1.

Figure 4B:
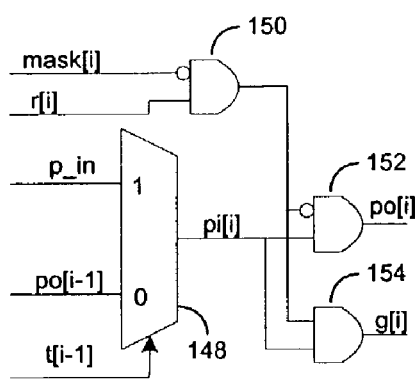
FIG. 4B is a logic gate diagram of one of the priority elements shown in FIG. 4A.

FIG. 4B is a logic gate diagram of one of the priority elements shown in FIG. 4A. As shown, the PE includes a multiplexer 148 and a number of AND gates 150, 152, and 154. The PE receives a token signal t[i−1]. If the t[i−1] signal is "1" (indicating the present PE is the "starting PE"), the multiplexer transfer the p_in signal to its output terminal. The p_in signal indicates whether access to shared communication resource is now available at the current Priority Level. In this manner, the "starting PE" introduces the opportunity to grant access, if it exists, into the present ring of PEs. If the t[i−1] signal is "0" (indicating the present PE is not the "starting PE," but one of the other PEs), the multiplexer transfers the po[i−1] signal to its output terminal. The po[i−1] signal is an indication from the previous PE in the ring as to whether the shared communication resource has yet been assigned. This passes the opportunity to grant access, if it exists, from the previous PE in the ring to the present PE. The signal at the output terminal of multiplexer 148 is labeled as intermediate signal pi[i].

At this point, the intermediate signal pi[i] indicates whether the present PE possesses opportunity to grant access to the shared communication resource. By the function of the AND gates 150 and 154, if (1) the intermediate signal pi[i] is "1" (indicating the present PE possess the opportunity to grant access), (2) the signal r[i] is "1" (indicating the device corresponding to the present PE has requested access), and (3) the signal mask[i] is "0" (indicating the present PE has not been "masked out," or disabled), then the present PE grants access to the shared communication resource to the device corresponding to the present PE. This is indicated by outputting a signal g[i] as "1." By a comparable function of the AND gates 150 and 152, the present PE outputs a po[i] signal to indicate whether the opportunity to grant access to the shared communication resource is still available after the present PE operates as discussed above.

The structures shown in FIGS. 4A and 4B provide an efficient implementation using combinatorial logic that is readily realized using simple hardware. The logical operations performed by the structures of FIGS. 4A and 4B can be summarized by the following statements:

for i=0, 1 , . . . , n−1
po[i]=~r[i] && pi[i]
p[0]=t[0] ? p_in: po[n−1]
for i=1, 2, . . . , n−1
pi[i]=t[i] ? p_in:po[i−1]

Since the above operations can be achieved using combinatorial logic, the function of arbitrating amongst competing devices can be performed with significant efficiency and speed.

In each arbitration cycle, the choice of which PE operates first (which PE is the "starting PE") is determined by the particular arbitration algorithm selected. For example, in a fixed-priority algorithm, one particular PE is always the "starting PE." In a round-robin scheme, for example, the PEs take turns at being the "starting PE." As discussed previously, the n-bit token signal t[3:0](n=4) indicates which one of the PEs 138, 140, 142, and 144 is the "starting PE" for the current arbitration cycle. The t[3:0] signal is provided by the appropriate TE Ring, which is described in detail below.

Figure 5A:
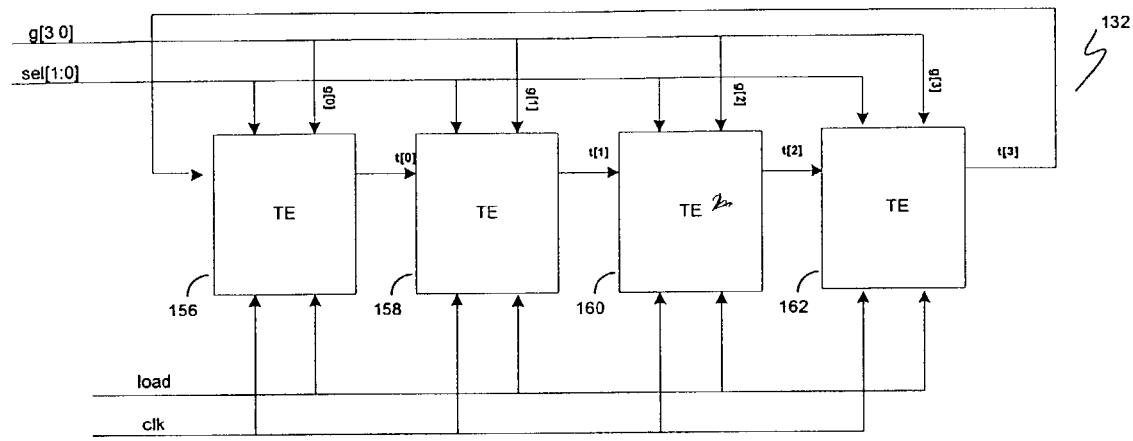
FIG. 5A is a high level logic block diagram of one of the token element rings shown in FIG. 3.

FIG. 5A is a high level logic block diagram of one of the TE rings shown in FIG. 3. Here, TE Ring 132 is illustrated as an example. As shown, TE Ring 132 includes four token elements ("TEs"): TE 156, TE 158, TE 160, and TE 162, each corresponding to a device in Priority Level 0. The term token element is chosen as a convenient label for a set of structures demonstrating an embodiment of the present invention illustrated in the figures and described herein and is not used to restrict such structures in any sense. While four TEs are shown, any number of TEs may be implemented. Positioned at Priority Level 0, TE Ring 132 provides the four-bit token signal t0[3:0] (consisting of t0[0], t0[1], t0[2], and t0[3]) to PE Ring 126 (not shown). TE Ring 132 also receives a one-bit load signal providing the instruction to load memory register(s) for the subsequent arbitration cycle in the arbitration algorithm, a two-bit algorithm select signal sel[1:0] indicating the selection of a particular arbitration algorithm for Level 0, and the four-bit grant signal g0[n−1:0] generated by PE Ring 126 indicating which PE within PE Ring 126, if any, has been granted access.

In one embodiment, the load signal indicates each arbitration cycle of the arbitration algorithm. That is, each time the load signal is "1 " as clocked by a cycle of the clk signal, a new arbitration cycle occurs, and TE Ring 132 outputs a new value on the token signal t0[3:0] to indicate a new "starting PE."

As described previously, in each arbitration cycle, the choice of which PE operates first (which PE is the "starting PE") is determined by the particular arbitration algorithm selected. TE Ring 132 outputs a four-bit token signal t0[3:0] to PE Ring 126 to indicate the chosen "starting PE." The operation of TE Ring 132 varies depending on the selection of the arbitration algorithm, as indicated by the algorithm select signal sel[1:0]. As shown in FIG. 5A, the two-bit algorithm select signal sel[1:0] is capable of indicating the selection of one out of four possible algorithms, as represented by the four possible two-bit patterns "00," "01," "10," and "11." In this example, the mapping of the four possible values of the two-bit sel[1:0] signal to specific arbitration algorithms is as follows:

| sel[1:0] | arbitration algorithm |
|---|---|
| 00 | fixed-priority |
| 01 | round-robin |
| 10 | MRU |
| 11 | unassigned |

The algorithm select signal sel[1:0] can be expanded to accommodate a greater number of arbitration algorithms.

Figure 5B:
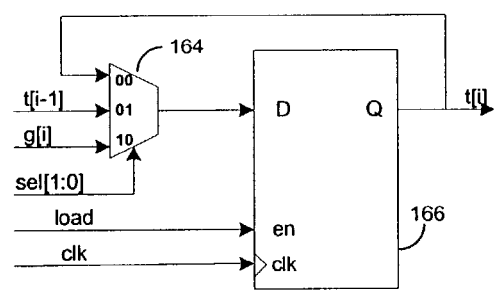
FIG. 5B is a logic gate diagram of one of the token elements shown in FIG. 5A.

FIG. 5B is a logic gate diagram of one of the token elements ("TEs") shown in FIG. 5A. The structure of the TE shown in FIG. 5B, as used in TE Ring 132, allows the arbitration algorithm used in the current priority level (Level 0, in this example) to be dynamically switchable. This allows the multiple-level bus arbitration structure to independently and dynamically control the arbitration algorithm employed at each priority level. For example, in one arbitration cycle, the three-level bus arbitration structure 124 shown in FIGS. 2 and 3 may be employing a fixed-priority arbitration algorithm at Priority Level 0, a round-robin arbitration algorithm at Priority Level 1, and an MRU arbitration algorithm at Level 2. In the very next arbitration cycle, which can be as soon as a single clock cycle later according to the embodiment described herein, the three-level bus arbitration circuit diagram 124 may choose to employ an MRU arbitration scheme at Priority Level 0, a fixed-priority arbitration algorithm at Priority Level 1, and a fixed-priority arbitration algorithm again at Priority Level 2. The change of arbitration algorithm at one or more priority levels occurs "on the fly" and does not disrupt the arbitration operation.

The TE shown in FIG. 5B includes a multiplexer 164 and a D flip-flop 166. The multiplexer 164 receives the algorithm select signal sel[1:0]. Depending on the arbitration algorithm, as indicated by the algorithm select signal sel[1:0], the multiplexer 164 transfers to its output terminal a signal that is to be registered in the D flip-flop 166 and used as the next token signal t[i]. The multiplexer 164 does this by selecting one of the three following signals: (i) the token signal t[i] looped back from the output of the present TE; (ii) the token signal t[i−1] from the previous TE in the TE Ring 132; and (iii) the grant signal g[i] of the PE associated with the present TE.

For the fixed-priority arbitration algorithm (sel[1:0] ="00"), the multiplexer 164 selects the token signal t[i] looped back from the output of the present TE so that the token signal t[i] sent to each PE remains the same, or is "fixed," across multiple arbitration cycles. That is, if a particular PE is the "starting PE" in the current arbitration cycle, it will remain the "starting PE" in the subsequent arbitration cycle. For the round-robin arbitration algorithm (sel[1:0 ]="01"), the multiplexer 164 selects the token signal t[i−1] from the previous TE in the TE Ring 132 so that the order of priority is passed around from one TE to the next TE in the TE Ring 132, and thus passed from one PE to the next PE in the PE Ring 126. That is, if a particular PE is the "starting PE" in the current arbitration cycle, the next PE in the PE Ring 126 will become the "starting PE" in the subsequent arbitration cycle. For the MRU arbitration algorithm (sel[1:0]="10"), the multiplexer 164 selects the grant signal g[i] of the PE associated with the present TE so that the token signal t[i] sent to the PE depends on which PE, if any, was granted access (to the shared communication protocol) in the last arbitration cycle. As implemented here, if the a particular PE is granted access in the current arbitration cycle, the next PE in the PE Ring is selected as the "starting PE" in the subsequent arbitration cycle, which means the PE that is granted access in the current arbitration cycle will be ordered last in the next arbitration cycle and will not get to operate until each of the other PEs in the ring has operated. In this manner, the TE structure shown in FIG. 5B works in conjunction with the TE Ring structure shown in 5A to provide the appropriate token signal for each arbitration cycle of the dynamically switchable arbitration algorithm.

The embodiments described above allow a bus arbitration structure serving devices grouped into multiple levels of priority to employ different arbitration algorithms at different priority levels. Further, the embodiments described allow the multiple-level arbitration structure to independently and dynamically switch the arbitration algorithm employed at each priority level without disrupting the operation of the arbitration processes.

Although the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for arbitrating access to a shared resource comprising:
    deciding whether to grant access to said shared resource to at least one of a first plurality of devices in accordance with a selected one of a first plurality of arbitration algorithms; and
    deciding whether to grant access to said shared resource to at least one of a second plurality of devices in accordance with a selected one of a second plurality of arbitration algorithms that operates differently than said selected one of said first plurality of arbitration algorithms, if access to said shared resource is not granted to at least one of said first plurality of devices;
    wherein said selected one of said first plurality of arbitration algorithms is changeable to a different one of said first plurality of arbitration algorithms on a clock cycle basis, and wherein said selected one of said second plurality of arbitration algorithms is changeable to a different one of said second plurality of arbitration algorithms on said clock cycle basis.

2. The method according to claim 1 wherein at least one of said first plurality of arbitration algorithms is based on a fixed-priority algorithm.

3. The method according to claim 1 wherein at least one of said first plurality of arbitration algorithms is based on a round-robin algorithm.

4. The method according to claim 1 wherein at least one of said first plurality of arbitration algorithms is based on a most-recently-used algorithm.

5. The method according to claim 1 wherein said step for deciding whether to grant access to said shared resource to at least one of said first plurality of devices comprises the steps of:
    associating each of said first plurality of devices with one of a plurality of positions in a ring;
    selecting one of said first plurality of devices as a starting device in said ring according to said selected one of said first plurality of arbitration algorithms; and
    servicing each of said first plurality of devices in order according to its associated position in said ring, starting with said starting device, wherein servicing each device comprises detecting whether said device has requested access to said shared resource and granting said device access to said shared resource if said device has requested access and access is available.

6. The method according to claim 5 further comprising the step of storing in a memory unit at least one information state used in selecting said starting element, for each of said first plurality of devices.

7. The method according to claim 6 wherein said at least one information state relates to which one of said first plurality of devices was granted access to said shared resource in a previous arbitration cycle.

8. The method according to claim 6 wherein said at least one information state relates to which one of said first plurality of devices was selected as a starting device in a previous arbitration cycle.

9. The method according to claim 6 wherein said at least one information state stored by said memory unit is programmably selected.

10. The method according to claim 1 wherein said step for deciding whether to grant access to said shared resource to at least one of said first plurality of devices comprises the steps of:
    associating each of said first plurality of devices with one of a plurality of positions in a first ring;
    inputting to said first ring a first priority signal, a first token signal, a first request signal and a first mask signal; and
    outputting from said first ring a first grant signal and a second priority signal.

11. The method according to claim 10 wherein said step for deciding whether to grant access to said shared resource to at least one of said second plurality of devices comprises the steps of:
    associating each of said second plurality of devices with one of a plurality of positions in a second ring;
    inputting to said first ring said second priority signal, a second token signal, a second request signal and a second mask signal; and
    outputting from said second ring a second grant signal and a third priority signal.

12. The method according to claim 10 wherein said first token signal indicates which one of said first plurality of devices is a starting device in said first ring, said first request signal indicates which one(s) of said first plurality of devices have requested access to aid shared resource, said first mask signal indicates which one(s) of said first plurality of devices are disabled, said first grant signal indicates which one(s) of said first plurality of devices are granted access to aid shared resource.

13. The method according to claim 1 wherein said step for deciding whether to grant access to said shared resource to at least one of said first plurality of devices comprises the steps of:
    associating each of said first plurality of devices with one of a plurality of positions in a first ring; and
    inputting to said first ring, on each clock cycle, a select signal indicative of one of said first plurality of arbitration algorithms.

14. An apparatus for arbitrating access to a shared resource comprising:
- a first module adapted to decide whether to grant access to said shared resource to at least one of a first plurality of devices in accordance with a selected one of a first plurality of arbitration algorithms; and
- a second module in communication with said first module, said second module adapted to decide whether to grant access to said shared resource to at least one of a second plurality of devices in accordance with a selected one of a second plurality of arbitration algorithms that operates differently than said selected one of said first plurality of arbitration algorithms, if access to said shared resource is not granted to at least one of said first plurality of devices;
- wherein said selected one of said first plurality of arbitration algorithms is changeable to a different one of said first plurality of arbitration algorithms on a clock cycle basis, and wherein said selected one of said second plurality of arbitration algorithms is changeable to a different one of said second plurality of arbitration algorithms on said clock cycle basis.

15. The apparatus according to claim 14 wherein at least one of said first plurality of arbitration algorithms is based on a fixed-priority algorithm.

16. The apparatus according to claim 14 wherein at least one of said first plurality of arbitration algorithms is based on a round-robin algorithm.

17. The apparatus according to claim 14 wherein at least one of said first plurality of arbitration algorithms is based on a most-recently-used algorithm.

18. The apparatus according to claim 14 wherein said first module comprises
- a plurality of elements organized in a first ring, each element being associated with one of said first plurality of devices;
- wherein one of said plurality of elements is selected as a starting element according to said selected one of said first plurality of arbitration algorithms; and
- wherein each of said plurality of elements operates in order according to relative position in said ring, starting with said starting element, each said plurality of elements operating to detect whether an associated device has requested access to said shared resource and grant said device access to said shared resource if said associated device has requested access and access is available.

19. The apparatus according to claim 18 wherein each of said elements organized in said first ring comprises a memory unit for storing at least one information state used in selecting said starting element.

20. The apparatus according to claim 19 wherein said at least one information state relates to which one of said elements granted access to said shared resource to a corresponding device in a previous arbitration cycle.

21. The apparatus according to claim 19 wherein said at least one information state relates to which one of said elements was selected as a starting element in a previous arbitration cycle.

22. The apparatus according to claim 19 wherein said at least one information state stored by said memory unit is programmably selected.

23. The apparatus according to claim 14 wherein said first module decides whether to grant access to said shared resource to at least one of said first plurality of devices by:
- associating each of said first plurality of devices with one of a plurality of positions in a first ring;
- inputting to said first ring a first priority signal, a first token signal, a first request signal and a first mask signal; and
- outputting from said first ring a first grant signal and a second priority signal.

24. The apparatus according to claim 23 wherein said second module decides whether to grant access to said shared resource to at least one of said second plurality of devices by:
- associating each of said second plurality of devices with one of a plurality of positions in a second ring;
- inputting to said first ring said second priority signal, a second token signal, a second request signal and a second mask signal; and
- outputting from said second ring a second grant signal and a third priority signal.

25. The apparatus according to claim 23 wherein said first token signal indicates which one of said first plurality of devices is a starting device in said first ring, said first request signal indicates which one(s) of said first plurality of devices have requested access to aid shared resource, said first mask signal indicates which one(s) of said first plurality of devices are disabled, said first grant signal indicates which one(s) of said first plurality of devices are granted access to aid shared resource.

26. The apparatus according to claim 14 wherein said first module decides whether to grant access to said shared resource to at least one of said first plurality of devices by:
- associating each of said first plurality of devices with one of a plurality of positions in a first ring; and
- inputting to said first ring, on each clock cycle, a select signal indicative of one of said first plurality of arbitration algorithms.

27. A system for arbitrating access to a shared resource comprising:
- means for deciding whether to grant access to said shared resource to at least one of a first plurality of devices in accordance with a selected one of a first plurality of arbitration algorithms; and
- means for deciding whether to grant access to said shared resource to at least one of a second plurality of devices in accordance with a selected one of a second plurality of arbitration algorithms that operates differently than said selected one of said first plurality of arbitration algorithms, if access to said shared resource is not granted to at least one of said first plurality of devices;
- wherein said selected one of said first plurality of arbitration algorithms is changeable to a different one of said first plurality of arbitration algorithms on a clock cycle basis, and wherein said selected one of said second plurality of arbitration algorithms is changeable to a different one of said second plurality of arbitration algorithms on said clock cycle basis.

* * * * *